US008396323B2

(12) United States Patent
Huynh-Thu et al.

(10) Patent No.: US 8,396,323 B2
(45) Date of Patent: Mar. 12, 2013

(54) METHOD AND APPARATUS FOR MEASURING BLOCKINESS IN VIDEO IMAGES

(75) Inventors: Quan Huynh-Thu, Ipswich (GB);
Benjamin Pernot, Ipswich (GB)

(73) Assignee: Psytechnics Limited, Ipswich (GB)

( * ) Notice: Subject to any disclaimer, the term of this patent is extended or adjusted under 35 U.S.C. 154(b) by 816 days.

(21) Appl. No.: 12/427,179

(22) Filed: Apr. 21, 2009

(65) Prior Publication Data

US 2009/0274372 A1    Nov. 5, 2009

(30) Foreign Application Priority Data

Apr. 24, 2008  (EP) ..................... 08103716

(51) Int. Cl.
*G06K 9/40* (2006.01)
(52) U.S. Cl. ........ 382/275; 382/199; 382/266; 382/268; 382/269
(58) Field of Classification Search .................. 382/275, 382/199, 266, 268, 269
See application file for complete search history.

(56) References Cited

U.S. PATENT DOCUMENTS

| 5,974,196 | A | 10/1999 | Chang et al. | |
|---|---|---|---|---|
| 6,167,164 | A * | 12/2000 | Lee ............................... | 382/261 |
| 6,823,089 | B1 | 11/2004 | Yu et al. | |
| 2002/0076119 | A1 | 6/2002 | Unruh et al. | |
| 2003/0053708 | A1 | 3/2003 | Kryukov et al. | |
| 2004/0114685 | A1 * | 6/2004 | Kouloheris et al. ...... | 375/240.03 |
| 2005/0254692 | A1 | 11/2005 | Caldwell | |
| 2005/0276505 | A1 | 12/2005 | Raveendran | |
| 2007/0071356 | A1 * | 3/2007 | Caviedes et al. .............. | 382/268 |
| 2008/0013854 | A1 | 1/2008 | Crete et al. | |

FOREIGN PATENT DOCUMENTS

| EP | 1 193 649 | 4/2002 |
|---|---|---|
| GB | 2347811 A | 9/2000 |
| WO | 97/34422 | 9/1997 |
| WO | 2004/029879 | 4/2004 |

OTHER PUBLICATIONS

Cayula et al, Edge Detection Algorithm for SST Images, American Meteorological Society 1992.*
Wang et al., *No-Reference Perceptual Quality Assessment of JPEG Compressed Images*, IEEE ICIP 2002, Sep. 22, 2002, vol. 1, pp. 477-480.
European Extended Search Report, European Application No. 08103716.0, Feb. 11, 2009, 15 pages.
European Examination Report, European Application No. 08103716.0, May 21, 2010, 1 page.
Tan, K.T. et al., "A Multi-Metric Objective Picture-Quality Measurement Model for MPEG Video," IEEE Transactions on Circuits and Systems for Video Technology, Oct. 2000, pp. 1208-1213, vol. 10, No. 7.

* cited by examiner

*Primary Examiner* — Chan S Park
*Assistant Examiner* — Mark Roz
(74) *Attorney, Agent, or Firm* — Fenwick & West LLP

(57) ABSTRACT

The present invention relates to an apparatus and method for processing images, in particular for determining the degree of blockiness in coded images. The invention comprises apparatus and methods for determining a degree of blockiness by performing the steps of: for each of a plurality of pixels determining a vertical gradient measure in dependence upon the values of said pixel and neighbouring pixels; comparing said vertical gradient measure with a vertical gradient threshold and defining said pixel as a potential horizontal boundary in dependence thereon determining a horizontal gradient measure in dependence upon the values of said pixel and neighbouring pixels; comparing said horizontal gradient measure with a horizontal gradient threshold and defining said pixel as a potential vertical boundary in dependence thereon; and determining said blocking artefact measure in dependence upon the vertical gradient measure of pixels defined as a potential horizontal boundary and upon the horizontal gradient measure of pixels defined as a potential vertical boundary. Method and apparatus for generating a quality measure in dependence upon the measure of blockiness are also provided.

19 Claims, 6 Drawing Sheets

METHOD AND APPARATUS FOR MEASURING BLOCKINESS IN VIDEO IMAGES

BACKGROUND a. Field of the Invention

The present invention relates to an apparatus and method for processing images, in particular for determining the degree of blockiness in coded images.

The present invention describes a method to measure the blocking artefact in a digitally compressed still image or video signal. When a video signal is to be stored or transmitted over a telecommunications network, it is compressed using an encoding algorithm such that the encoded signal requires less storage space and can be transmitted over a reduced network bandwidth. Still images are also typically compressed for storage or transmission. The process of compression can introduce visual distortions and reduce the quality of the signal. Block distortion (also known as blocking or blockiness) is caused by image compression. It is characterized by the appearance of an underlying block structure in the image. This block structure is a common feature to all DCT (discrete cosine transform)—based video and still image compression techniques. Technically, it is often caused by coarse quantization of the spatial frequency components during the encoding process. In practice, blockiness appears when high data compression ratios are used, for example in order to transmit video content using a low bandwidth connection. Blockiness is subjectively annoying and for analysis of a perceptual quality of a decoded video signal it is helpful to identify and measure the level of blockiness in an encoded/transmitted video/image.

The main visual degradation appearing in digitally compressed image or video is caused by the coarse quantization of the transform coefficients in the compression process. Most modern image compression algorithms use a two-dimensional (DCT) producing a series of transform coefficients, which are then quantized. The quantization is at the origin of the visual distortion known as blocking artefact (or blockiness). A coarser quantization (larger quantization step) will usually cause stronger blockiness. Because the compression algorithm independently applies the DCT transform to blocks of M×N pixels, the compressed image will exhibit vertical and horizontal boundaries at the edges of the DCT blocks. Usual values for M and N are M=N=8 in video codecs such as MPEG-2, H.261 and H263.

b. Related Art

'Intrusive' or 'out-of-service' metrics which require comparison of a decoded signal to a reference signal such as those described in United Kingdom Patent Application No GB2347811 "Measuring blockiness in decoded video images", United States Patent Application No US2007071356 2007 "Method and apparatus for blocking artefact detection and measurement in block-coded video", "A Multi-Metric Objective Picture-Quality Measurement Model for MPEG Video", IEEE Transactions on Circuits and Systems for Video Technology, Vol. 10, NO. 7, October 2000 are of only background interest to the present invention which is focussed towards 'non-intrusive' or 'in-service' metrics as it is desirable to be able to analyse the degree of blockiness in a received decoded signal without having to compare the decoded signal to the original transmitted signal.

Methods proposed in prior art rely mostly on identifying the block boundaries introduced by the block-based compression algorithm and measuring intensity differences at these block boundaries. One common drawback of prior-art methods for measuring blockiness is that the exact location of block boundaries must be known or assumed. Spatial shifts of the block structure with respect to the origin are assumed to be zero, which may not always be the case. Likewise, blocks not aligned in a certain grid fashion (e.g. 8×8 grid or 16×16 grid) will not be properly recognized.

SUMMARY OF THE INVENTION

According to the invention there is provided a method of determining a blocking artefact measure relating to blocking artefacts in a digital image comprising a plurality of pixels each pixel having a value, the method comprising the steps of: for each of a plurality of pixels determining a vertical gradient measure in dependence upon the values of said pixel and neighbouring pixels; comparing said vertical gradient measure with a vertical gradient threshold and defining said pixel as a potential horizontal boundary in dependence thereon determining a horizontal gradient measure in dependence upon the values of said pixel and neighbouring pixels; comparing said horizontal gradient measure with a horizontal gradient threshold and defining said pixel as a potential vertical boundary in dependence thereon; and determining said blocking artefact measure in dependence upon the vertical gradient measure of pixels defined as a potential horizontal boundary and upon the horizontal gradient measure of pixels defined as a potential vertical boundary.

Preferably the vertical gradient measure is determined in dependence upon the difference between an average of the values of said pixel and of horizontally neighbouring pixels and an average of corresponding vertically neighbouring pixels.

Even more preferably the vertical gradient measure is equal to the greater of the difference between an average of the values of said pixel and three immediately neighbouring left pixels and an average of the values of four corresponding vertically neighbouring pixels; and the difference between an average of the values of said pixel and three immediately neighbouring right pixels and an average of the values of four corresponding vertically neighbouring pixels.

In one embodiment, the vertical gradient threshold is set in dependence upon the lower of the average of the values of said pixel and of horizontally neighbouring pixels and the average of corresponding vertically neighbouring pixels.

It is an advantage if prior to determining said blocking artefact measure the method further comprises the steps of: dividing the pixels into vertical sets comprising immediately neighbouring vertical pixels; and for each set identifying a peak pixel having a peak value of the vertical gradient measures of said set; determining an average gradient value for said set; defining all the pixels in the set as not being a potential horizontal boundary excepting the peak pixel in the event that the peak gradient value is greater than a predetermined proportion of said average and including the peak pixel in the event that the peak gradient value is not greater than a predetermined proportion of said average Preferably, prior to determining said blocking artefact measure the method further comprises the steps of: identifying a plurality of immediately neighbouring horizontal pixels being defined as a potential horizontal boundary and being bordered by horizontal pixels not defined as a potential horizontal boundary; and in the event that said plurality is fewer than a predetermined number of pixels, defining all said plurality of pixels as not being a potential horizontal boundary.

Preferably the horizontal gradient measure is determined in dependence upon the difference between an average of the values of said pixel and of vertically neighbouring pixels and an average of corresponding horizontally neighbouring pixels.

Even more preferably, the horizontal gradient measure is equal to the greater of the difference between an average of the values of said pixel and three immediately neighbouring higher pixels and an average of the values of four corresponding horizontally neighbouring pixels; and the difference between an average of the values of said pixel and three immediately neighbouring lower pixels and an average of the values of four corresponding horizontally neighbouring pixels.

In one embodiment, the horizontal gradient threshold is set in dependence upon the lower of the average of the values of said pixel and of vertically neighbouring pixels and the average of corresponding horizontally neighbouring pixels.

Preferably, prior to determining said blocking artefact measure the method further comprises the steps of: dividing the pixels into horizontal sets comprising immediately neighbouring horizontal pixels; and for each set identifying a peak pixel having a peak value of the horizontal gradient measures of said set; determining an average value for said set; defining all the pixels in the set as not being a potential vertical boundary excepting the peak pixel in the event that the peak value is greater than a predetermined proportion of said average and including the peak pixel in the event that the peak value is not greater than a predetermined proportion of said average.

Preferably, prior to determining said blocking artefact measure the method further comprises the steps of: identifying a plurality of immediately neighbouring vertical pixels being defined as a potential vertical boundary and being bordered by vertical pixels not defined as a potential vertical boundary; and in the event that said plurality is fewer than a predetermined number of pixels, defining all said plurality of pixels as not being a potential vertical boundary.

The blocking artefact measure may be determined in dependence upon a sum of the maximum of the vertical gradient measure of pixels defined as a potential horizontal boundary and the horizontal gradient measure of pixels defined as a potential vertical boundary.

The blocking artefact measure may be determined in dependence upon the total number of pixels defined as a potential horizontal boundary and pixels defined as a potential vertical boundary.

According to another aspect of the invention a blocking artefact measure as described above is used to generate an image quality measure in a method of image quality assessment and said quality measure may be stored for visual display and analysis.

A method of video signal quality assessment may comprise generating a video signal quality measure in dependence upon a plurality of image quality measures relating to a plurality of image frames and said video signal quality measure may be stored for visual display and analysis.

An apparatus, a computer program and a computer readable medium carrying a computer program for performing methods in accordance with the invention are also provided.

BRIEF DESCRIPTION OF THE DRAWINGS

Embodiments of the invention will now be described, by way of example only, with reference to the accompany drawings, in which.

DETAILED DESCRIPTION

Figure 1:
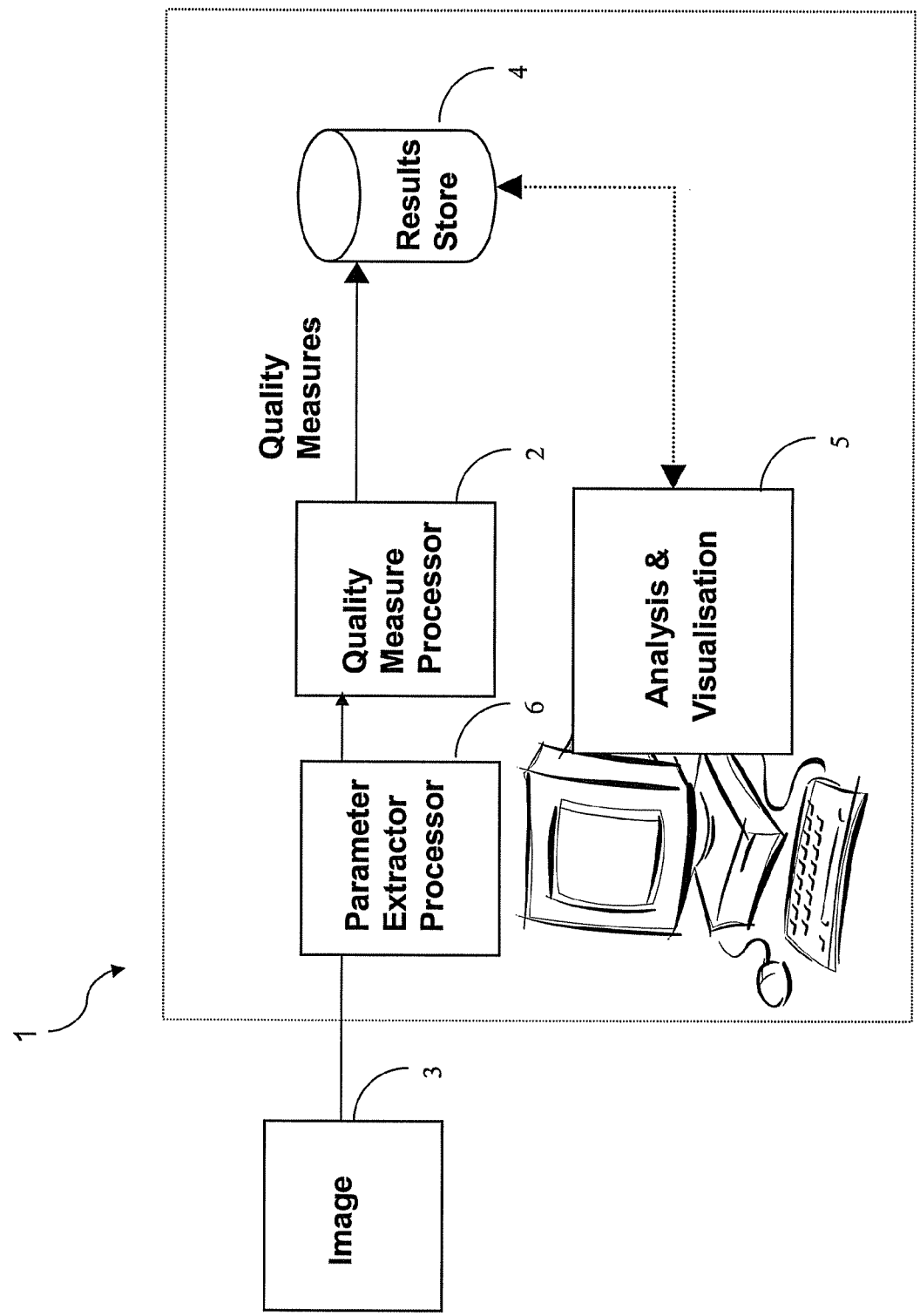
FIG. 1 is an illustration of an apparatus according to the present invention.

Referring now to FIG. 1 a system is illustrated for measuring blocking artefacts in an image and storing a quality measure for visualisation and analysis by a user.

A non-intrusive quality assessment system 1 is connected to receive a signal representing an image 3. The system 1 comprises a parameter extractor processor 6 arranged to extract parameters which are relevant to quality from the image 3 and a store 4 connected to receive and store quality measures. Extracted parameters are used by quality measure processor 2 (which may or may not be part of the same system as processor 6) to generate a quality measure which is then sent to analysis and visualisation module 5 (which may or may not be part of the same system as processors 2 or 6) to analyse the extracted measures of quality and to provide a user with a prediction of the perceived quality of the image.

Quality prediction models typically produce a set of intermediate parameters from the input signal (or signals in the case of a full-reference model) such that each parameter changes in response to the presence and severity of one or more classes of image impairment. Said intermediate parameters are then combined to produce a single quality prediction value that correlates with the mean opinion score (MOS) that would be obtained for the decoded input signal when assessed by human subjects in a subjective experiment. The parameter combination step can be a simple weighted sum. Methods for optimising the relative weights of the parameters, like multi-variable regression, are well known to those skilled in the art and are not directly relevant to the present invention. An example of a video quality prediction model that uses an intermediate set of parameters as described above is provided in Annex A of ITU-T Recommendation J.144, "Objective perceptual video quality measurement techniques for digital cable television in the presence of a full reference", with the weighted sum of the parameters performed according to Equation A.4-2. ITU-R Recommendation BT-500, "Methodology for the subjective assessment of the quality of television pictures" describes methods of performing subjective experiments for video signals.

Details relating to images which have been analysed are stored for later reference. A sequence of images comprising frames of a video sequence may be analysed and the quality prediction may be updated so that over a period of time the quality prediction relates to a plurality of analysed frames of data comprising a video sequence.

Figure 2:
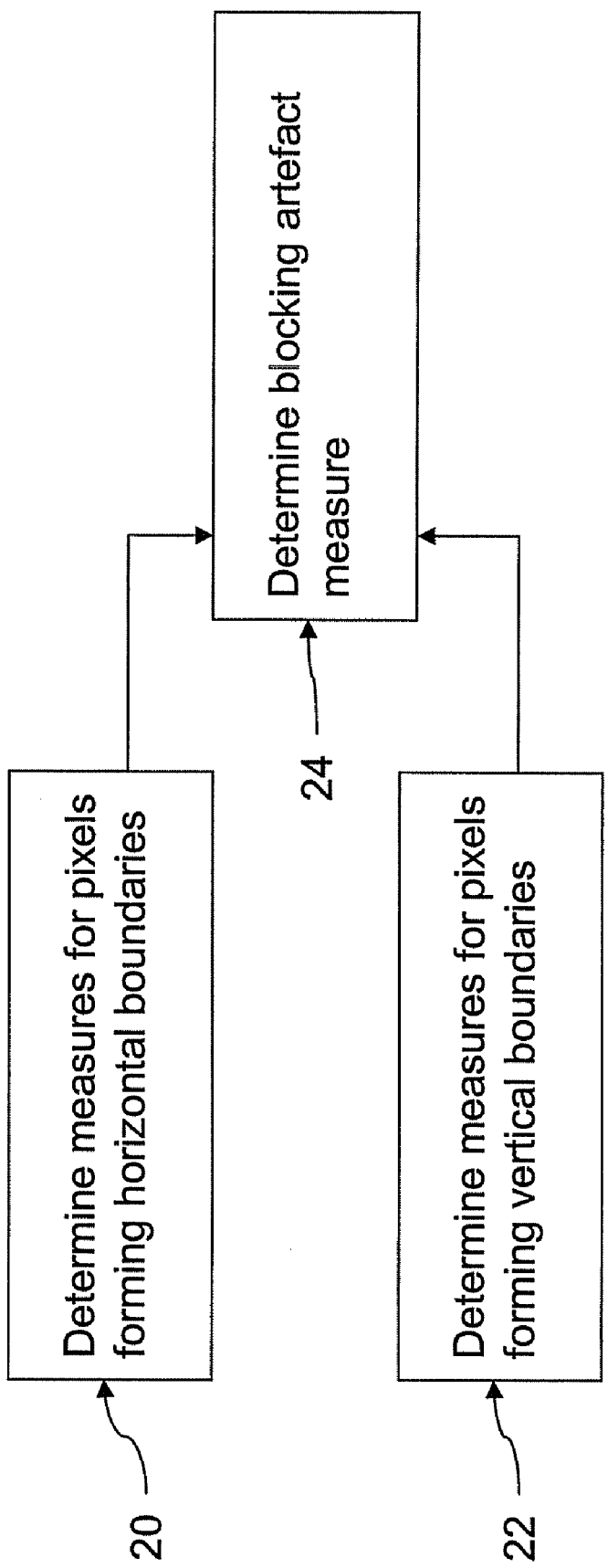
FIG. 2 is a flow chart of an overview of a method of determining a blocking artefact measure.
Figure 3:
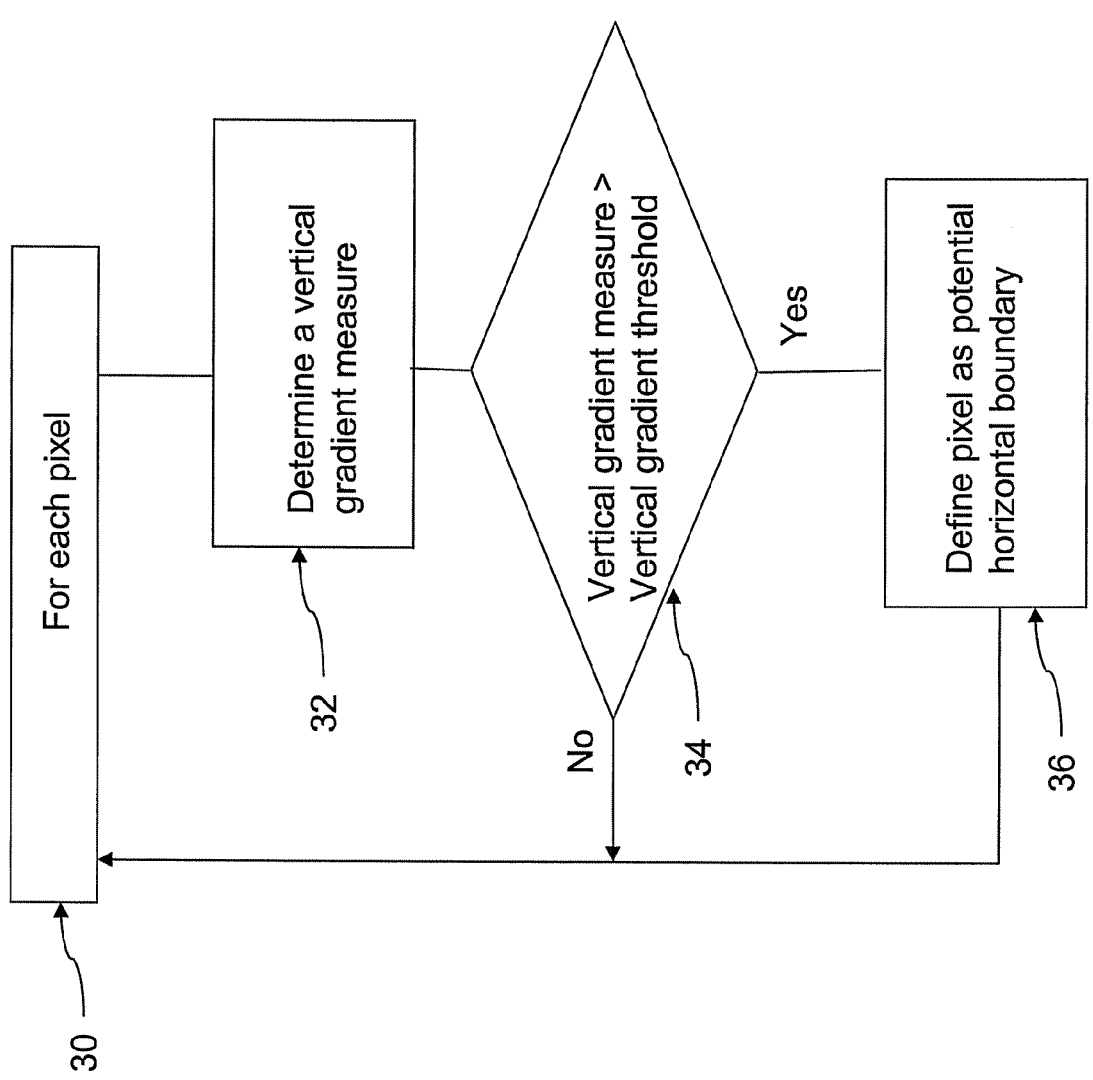
FIG. 3 is a flow chart illustrating part of a method for determining whether a pixel is to be identified as a potential horizontal boundary.
Figure 4:
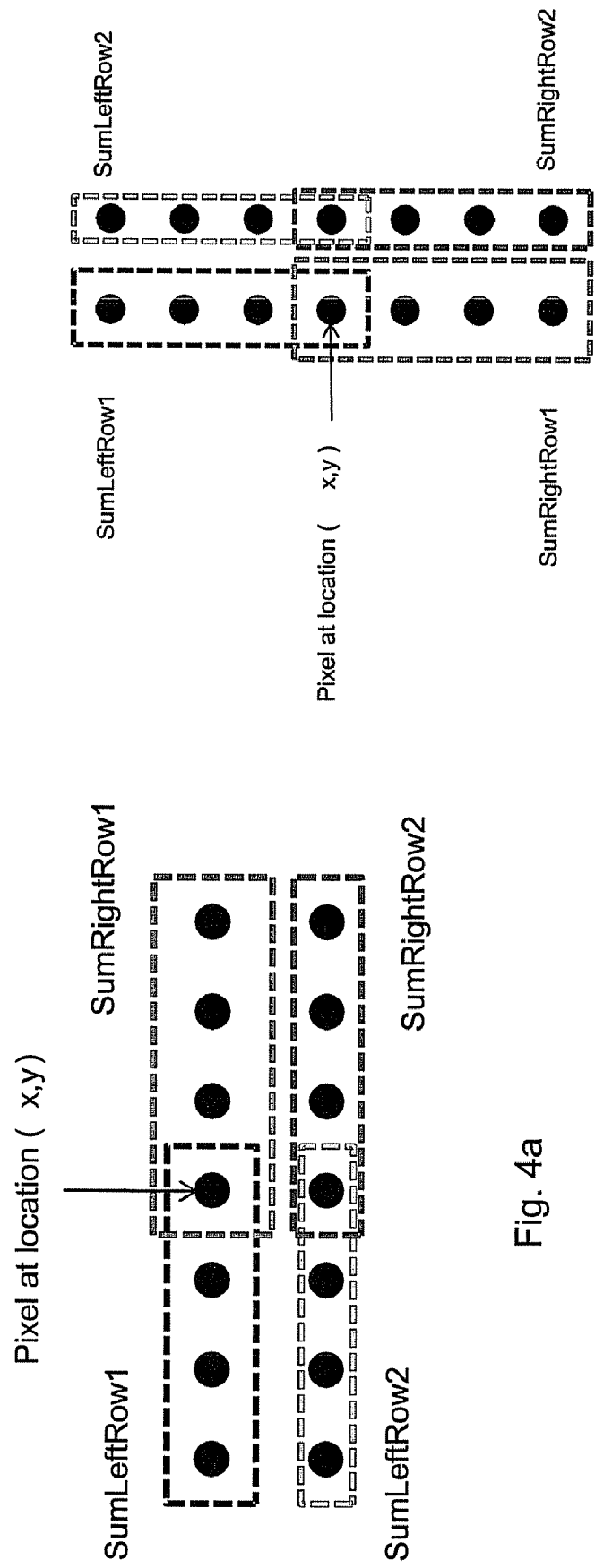
FIGS. 4a and 4b illustrate a pixel and surrounding pixels used in one embodiment of an algorithm for determining whether a pixel is to be identified as a potential horizontal or vertical boundary.
Figure 5:
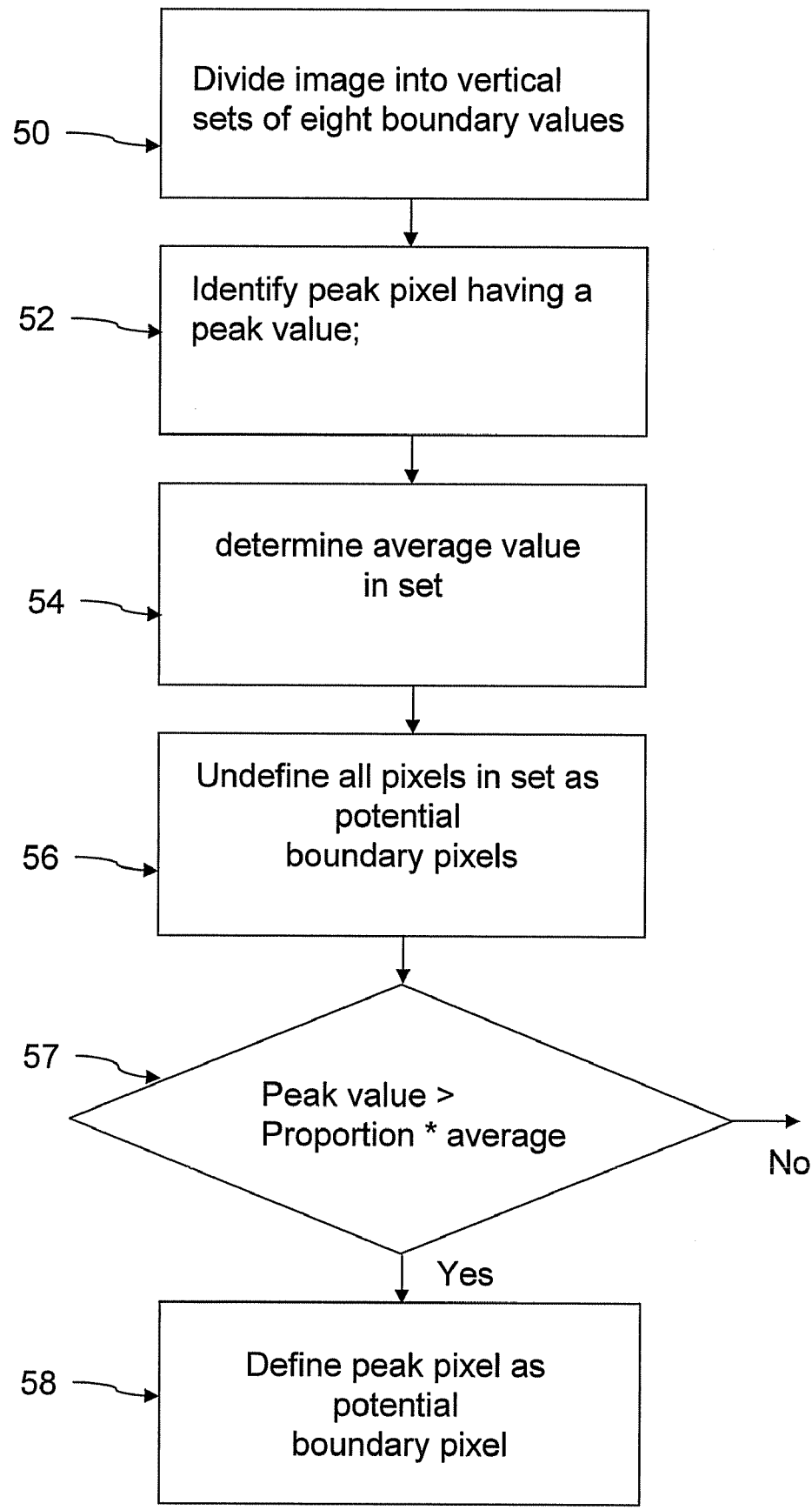
FIG. 5 is a flow chart illustrating part of a method for determining whether a pixel is to be identified as a potential horizontal boundary according to a preferred embodiment of the invention.

Referring now to FIG. 2 an overview of the method of the present invention is shown. At step 20 measures are generated for pixels potentially forming horizontal boundaries and at step 22 measures are generated for pixels potentially forming vertical boundaries. Then at step 24 a blocking artefact measure is generated for the frame. It will be appreciated that steps 20 and 22 may be performed either in order or in parallel without materially affecting the method of the invention. FIGS. 3, 4 and 5 illustrate the process of generating measures for pixels potentially forming horizontal boundaries in more detail. The detection of horizontal boundaries is based on the calculation of a vertical gradient measure, which is compared to a vertical gradient threshold.

Referring now to FIG. 3 and FIG. 4*a*, a vertical gradient measure for an image of width W and height H is determined using four 4×1 sets of pixels corresponding to each relevant pixel as follows.

Because a 4×1 neighbourhood is used in the preferred embodiment of the invention the first three and last three columns of pixels will not have a vertical gradient measure determined and are not therefore 'relevant'. Let Y(x,y) denote the luminance of a pixel in column x and row y. For each relevant pixel at step 30 ie.

for x=X1, . . . , W-X1-1 and y=Y1, . . . , H-Y1-1;
where X1=Y1=3

The vertical gradient measure is determined at step 32 in dependence upon the luminance value of said pixel and of neighbouring pixels as follows: Firstly an average of the pixel and three immediately neighbouring left pixels is determined $$SLR1(x, y) = \frac{1}{X1+1} \sum_{i=0}^{X1} Y(x-i, y)$$

and an average of four corresponding vertically neighbouring pixels is determined $$SLR2(x, y) = \frac{1}{X1+1} \sum_{i=0}^{X1} Y(x-i, y+1)$$

Then an average of the pixel and three immediately neighbouring right pixels is determined $$SRR1(x, y) = \frac{1}{X1+1} \sum_{i=0}^{X1} Y(x+i, y)$$

and an average of four corresponding vertically neighbouring pixels is determined $$SRR2(x, y) = \frac{1}{X1+1} \sum_{i=0}^{X1} Y(x+i, y+1)$$

A vertical gradient measure (delta(x,y)) is determined to be equal to the greater of the difference between an average of the luminance values of said pixel and three immediately neighbouring left pixels and an average of the luminance values of four corresponding vertically neighbouring pixels and the difference between an average of the luminance values of said pixel and three immediately neighbouring right pixels and an average of the luminance values of four corresponding vertically neighbouring pixels i.e.

if $|SLR1(x, y) - SLR2(x, y)| > |SRR1(x, y) - SRR2(x, y)|$ $\text{delta}(x, y) = |SLR1(x, y) - SLR2(x, y)|$ else $\text{delta}(x, y) = |SRR1(x, y) - SRR2(x, y)|$ A minimum value (Ymin(x,y)) is defined to be the lower of the average of the luminance values of the pixel and of horizontally neighbouring pixels and the average of corresponding vertically neighbouring pixels used in the calculation of delta(x,y) i.e.

if $|SLR1(x, y) - SLR2(x, y)| > |SRR1(x, y) - SRR2(x, y)|$ $Y\min(x, y) = \min(SLR1(x, y), SLR2(x, y))$ else $Y\min(x, y) = \min(SRR1(x, y), SRR2(x, y))$ At step 34 the vertical gradient measure is compared to a vertical gradient threshold and if the measure is greater than the threshold (ie if delta(x,y)>GradientThreshold) then the pixel is defined as a potential horizontal boundary at step 36 by setting a value in a horizontal boundary matrix (BlockH (x,y)) to be equal to delta(x,y) otherwise the value is set to be equal to 0.

In the preferred embodiment the vertical gradient threshold is set in dependence upon the minimum value defined above Ymin(x,y) so the horizontal boundary matrix value BlockH (x,y) is determined as follows;

If $\text{delta}(x, y) > GradientThreshold[Y\min(x, y)]$ $BlockH(x, y) = \text{delta}(x, y)$ else $BlockH(x, y) = 0$ i.e. potential horizontal boundary pixels are identified by having a horizontal boundary matrix value other than zero.

Where GradientThreshold[256] is a sequence of defined thresholds:

| 255, | 255, | 255, | 255, | 48, | 42, | 38, | 34, | 31, | 28, | 26, | 23, | 21, | 19, | 18, | 16, |
|---|---|---|---|---|---|---|---|---|---|---|---|---|---|---|---|
| 15, | 13, | 12, | 10, | 9, | 8, | 8, | 8, | 8, | 8, | 8, | 8, | 8, | 8, | 8, | 8, |
| 8, | 8, | 8, | 8, | 8, | 8, | 8, | 8, | 8, | 8, | 8, | 8, | 8, | 8, | 8, | 8, |
| 8, | 8, | 8, | 8, | 8, | 8, | 8, | 8, | 8, | 8, | 8, | 8, | 8, | 8, | 8, | 8, |
| 8, | 8, | 8, | 8, | 8, | 8, | 8, | 8, | 8, | 8, | 8, | 8, | 8, | 8, | 8, | 8, |
| 8, | 8, | 8, | 8, | 8, | 8, | 8, | 8, | 8, | 8, | 8, | 8, | 8, | 8, | 8, | 8, |
| 8, | 8, | 8, | 8, | 8, | 8, | 8, | 8, | 8, | 8, | 8, | 8, | 8, | 8, | 8, | 8, |

-continued

| | | | | | | | | | | | | | | | |
|---|---|---|---|---|---|---|---|---|---|---|---|---|---|---|---|
| 8, | 8, | 8, | 8, | 8, | 8, | 8, | 8, | 8, | 8, | 8, | 8, | 8, | 8, | 8, | 8, |
| 8, | 8, | 8, | 8, | 8, | 8, | 8, | 8, | 8, | 8, | 8, | 8, | 8, | 8, | 8, | 8, |
| 8, | 8, | 8, | 8, | 8, | 8, | 8, | 8, | 8, | 8, | 8, | 8, | 8, | 8, | 8, | 8, |
| 8, | 8, | 8, | 8, | 8, | 8, | 8, | 8, | 8, | 8, | 8, | 8, | 8, | 8, | 8, | 8, |
| 8, | 8, | 8, | 8, | 8, | 8, | 8, | 8, | 8, | 8, | 8, | 8, | 8, | 8, | 8, | 8, |
| 8, | 8, | 8, | 8, | 8, | 8, | 8, | 8, | 8, | 8, | 8, | 8, | 8, | 8, | 8, | 8, |
| 8, | 8, | 8, | 8, | 8, | 8, | 8, | 8, | 8, | 8, | 8, | 8, | 8, | 8, | 8, | 8, |
| 8, | 8, | 8, | 8, | 8, | 8, | 8, | 8, | 8, | 8, | 8, | 8, | 8, | 8, | 8, | 8, |
| 8, | 8, | 8, | 8, | 8, | 8, | 8, | 8, | 8, | 8, | 8, | 8, | 8, | 8, | 8, | 8 |

It is an advantage if the horizontal boundary matrix is processed further as will now be described with reference to FIGS. 5 and 6.

Referring now to FIG. 5, the horizontal boundary matrix values are grouped into sets of eight vertical values at step 50. It will be appreciated that other sizes of set could be used. A set size should be selected in which it would not be expected to find more than one horizontal boundary.

At step 52 a peak value within the set having a peak horizontal gradient value is identified:

At step 54 the average value of the selected set is determined. Now, assuming that either one or zero values in the selected set are to remain identified as potential boundaries all horizontal boundary matrix values in the set are reset to zero except for the peak gradient value only if the said value is greater than a predetermined proportion of the average value, otherwise all horizontal boundary matrix values are reset to zero. This may be implemented in a number of ways as will be readily understood by those skilled in the art, for example all horizontal boundary matrix values may be reset to zero at step 56 and then the peak gradient value reset at step 58 in the event that said value is greater than a predetermined proportion of the average value at step 57 as shown in the flow chart in FIG. 5. In the preferred embodiment the peak gradient remains identified as a potential boundary if the peak gradient value is greater than 1.7× the average value.

Figure 6:
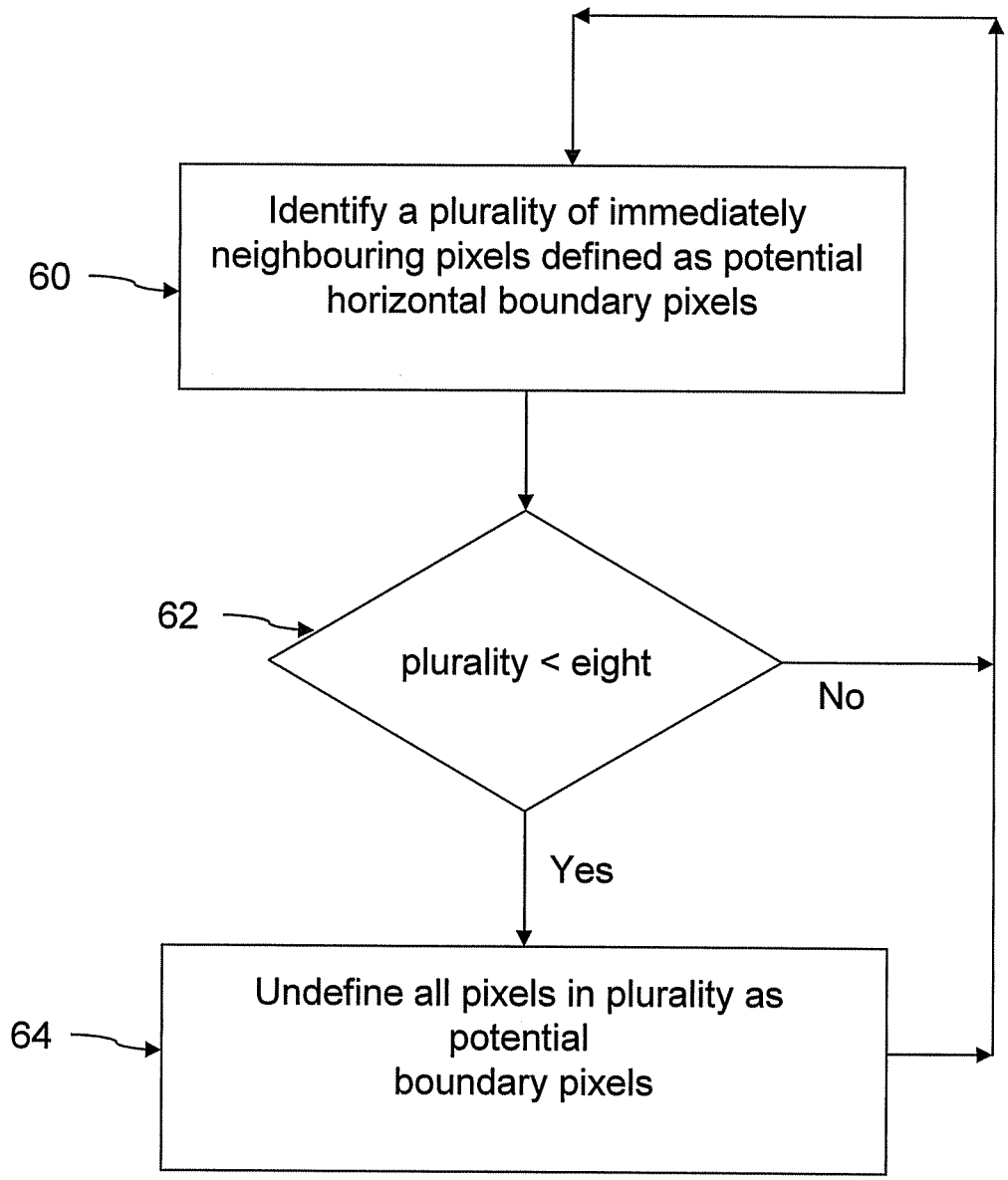
FIG. 6 is a flow chart illustrating part of a method for determining whether a pixel is to be identified as a potential horizontal boundary according to another preferred embodiment of the invention.

It is a further advantage if the horizontal boundary matrix value for pixels belonging to boundaries which are shorter than a predetermined length is reset to zero as shown in FIG. 6. In the preferred embodiment this threshold is set to eight, although it will be appreciated that other sizes of set could be used.

At step 60 a plurality of immediately neighbouring horizontal boundary matrix values defined as potential horizontal boundaries are identified, for example as shown in the following pseudo code:

```
for y = Y1, ... ,H - Y1 - 1
    Initialize the boundary length to 0
    for x = X1, ..., W - X1 - 1
        if BlockH(x,y) > 0
            if boundary length = 0 then mark this position as
            start of the boundary
            Increase the boundary length by 1
        else
            Mark this position as end of the boundary
``` at step 62 the boundary length is compared to the predetermined length and then at step 64 if the boundary is less than the predetermined length all values in the selected plurality of immediately neighbouring values in the horizontal boundary matrix are redefined to not be part of a horizontal boundary by resetting their value to zero i.e.

BlockH(x,y)=0 for all pixels on a horizontal boundary shorter than 8 pixels.

Once all of the horizontal boundary matrix values are determined, then vertical boundary matrix values (BlockV(x, y)) are determined in a similar fashion using 1×4 set of neighbouring pixels as illustrated in FIG. 4*b* to compute a horizontal gradient for each relevant pixel and then processing these horizontal gradient measures in an analogous manner to that described previously for determination of horizontal boundary matrix values (BlockH(x,y)).

An overall blocking artefact measure may then be determined at step 24 based upon a block map such that each element of the block map is set to one quarter of the maximum of the vertical and horizontal gradient measures of the associated pixel i.e.

$$BlockMap(x, y) = \frac{\max(BlockH(x, y), BlockV(x, y))}{4}$$

In one embodiment the blocking artefact measure is based upon a sum of the block map values:

for $x=(2*X1), \ldots, W-(2*X1)-1$ and $y=(2*Y1), \ldots, H-(2*Y1)-1$:

$$Edg1BlockinessA = \sum_{x,y} BlockMap(x, y)$$

n another embodiment the blocking artefact measure is based upon the total number of pixels defined as a potential horizontal or vertical boundary in the block map as follows:

for $x = (2*X1), \ldots, W-(2*X1)-1$ and $y = (2*Y1), \ldots, H-(2*Y1)-1$:

$$Edg1Blockiness = \sum_{x,y} P(x, y)$$

where $$P(x, y) = \begin{cases} 1, & \text{if } BlockMap(x, y) > 0 \\ 0, & \text{Otherwise} \end{cases}$$

If a blocking measure is to be calculated for the whole or portion of a video signal, then a blocking measure (Edg1BlockinessA or Egd1BlockinessB) is first calculated for each frame in the video sequence and then averaged to produce a measure for the video sequence being analysed.

In the preferred embodiment of the invention the value of a pixel is its luminance value. However, it will be appreciate by those skilled in the art that other values of a pixel could be used in alternative embodiments, for example the value of the red, green or blue component when the pixel is mapped to an RGB colour space.

It will be understood by those skilled in the art that the processes described above may be implemented on a conventional programmable computer, and that a computer program encoding instructions for controlling the programmable computer to perform the above methods may be provided on a computer readable medium.

It will be appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

It is to be recognized that various alterations, modifications, and/or additions may be introduced into the constructions and arrangements of parts described above without departing from the scope of the present invention as defined in the appended claims.

The invention claimed is:

1. A method of determining a blocking artefact measure relating to blocking artefacts in a digital image comprising a plurality of pixels having a value, the method comprising:
    for each of a plurality of pixels
        determining a vertical gradient measure in dependence upon the values of said pixel and horizontally and vertically neighbouring pixels, in which the vertical gradient measure is equal to the greater of (a) the difference between an average of the values of said pixel and three pixels to a first side of said pixel and an average of the values of four pixels positioned vertically to said pixel, and (b) the difference between an average of the values of said pixel and three pixels to a second side of said pixel; and an average of the values of four pixels positioned vertically to said pixel;
        comparing said vertical gradient measure with a vertical gradient threshold and defining said pixel as a potential horizontal boundary in response to the vertical gradient measure exceeding the vertical gradient threshold;
        determining a horizontal gradient measure in dependence upon the values of said pixel and horizontally and vertically pixels;
        comparing said horizontal gradient measure with a horizontal gradient threshold and defining said pixel as a potential vertical boundary in response to the horizontal gradient measure exceeding the horizontal gradient threshold; and
        determining said blocking artefact measure in dependence upon the vertical gradient measure of pixels defined as the potential horizontal boundary and upon the horizontal gradient measure of pixels defined as the potential vertical boundary.

2. A method according to claim 1, in which the vertical gradient threshold is set in dependence upon the lower of the average of the values of said pixel and of horizontally pixels and the average of vertically pixels.

3. A method according to claim 1 in which prior to determining said blocking artefact measure the method further comprises:
    dividing the pixels into vertical sets comprising immediately neighbouring vertical pixels; and for each set
    identifying a peak pixel having a peak value of the vertical gradient measures of said set;
    determining an average gradient value for said set;
    defining all the pixels in the set as not being the potential horizontal boundary
        excepting the peak pixel from being defined as not being the potential horizontal boundary in the event that the peak gradient value is greater than a predetermined proportion of said average; and
        including the peak pixel in being defined as not being the potential horizontal boundary in the event that the peak gradient value is not greater than a predetermined proportion of said average.

4. A method according to claim 3, in which prior to determining said blocking artefact measure the method further comprises:
    identifying a plurality of horizontal pixels being defined as the potential horizontal boundary and being bordered by horizontal pixels not defined as the potential horizontal boundary; and
    in the event that said plurality is fewer than a predetermined number of pixels, defining all said plurality of pixels as not being the potential horizontal boundary.

5. A method according to claim 1, in which said horizontal gradient measure is determined in dependence upon the difference between an average of the values of said pixel and of vertically neighbouring pixels relative to said pixel and an average of horizontally neighbouring pixels relative to said pixel.

6. A method according to claim 5, in which the horizontal gradient measure is equal to the greater of
    the difference between an average of the values of said pixel and three higher pixels and an average of the values of four horizontally neighbouring pixels; and
    the difference between an average of the values of said pixel and three lower pixels and an average of the values of four horizontally neighbouring pixels.

7. A method according to claim 6, in which the horizontal gradient threshold is set in dependence upon the lower of the average of the values of said pixel and of vertically neighbouring pixels and the average of horizontally neighbouring pixels.

8. A method according to claim 5 in which prior to determining said blocking artefact measure the method further comprises:
    dividing the pixels into horizontal sets comprising neighbouring horizontal pixels; and for each set
    identifying a peak pixel having a peak value of the horizontal gradient measures of said set;
    determining an average value for said set;
    defining all the pixels in the set as not being the potential vertical boundary
        excepting the peak pixel from being defined as not being the potential horizontal in the event that the peak value is greater than a predetermined proportion of said average and
        including the peak pixel in being defined as not being the potential horizontal boundary in the event that the peak value is not greater than a predetermined proportion of said average.

9. A method according to claim 8, in which prior to determining said blocking artefact measure the method further comprises:
    identifying a plurality of immediately neighbouring vertical pixels being defined as the potential vertical boundary and being bordered by vertical pixels not defined as the potential vertical boundary; and
    in the event that said plurality is fewer than a predetermined number of pixels, defining all said plurality of pixels as not being the potential vertical boundary.

10. A method according to claim 1, in which the blocking artefact measure is determined in dependence upon a sum of the maximum of the vertical gradient measure of pixels defined as the potential horizontal boundary and the horizontal gradient measure of pixels defined as the potential vertical boundary.

11. A method according to claim 1, in which the blocking artefact measure is determined in dependence upon the total number of pixels defined as the potential horizontal boundary and pixels defined as the potential vertical boundary.

12. A method according to claim 1, in which the pixel value is a luminance value.

13. The method of claim 1, further comprising generating a quality measure in dependence upon a blocking artefact measure.

14. The method of claim 1, further comprising generating a quality measure in dependence upon a plurality of blocking artefact measures relating to a plurality of image frames in the video signal.

15. A method according to claim 13 further comprising the step of storing the quality measure for visualization and analysis.

16. A non-transitory computer readable medium carrying a computer program for implementing the method according to claim 1.

17. An apparatus for determining a measure of blocking artefacts in a digital image comprising a plurality of pixels having a value, the apparatus comprising:
 a processor for generating a quality measure;
 a store for storing said quality measure;
 the processor capable of executing instructions to perform steps offor each of a plurality of pixels
 determining a vertical gradient measure in dependence upon the values of said pixel and horizontally and vertically neighbouring pixels, in which the vertical gradient measure is equal to the greater of (a) the difference between an average of the values of said pixel and three pixels to a first side of said pixel and an average of the values of four pixels positioned vertically to said pixel, and (b) the difference between an average of the values of said pixel and three pixels to a second side of said pixel and an average of the values of four pixels positioned vertically to said pixel;
 comparing said vertical gradient measure with a vertical gradient threshold and defining said pixel as a potential horizontal boundary in response to the vertical gradient measure exceeding the vertical gradient threshold;
 determining a horizontal gradient measure in dependence upon the values of said pixel and horizontally and vertically pixels;
 comparing said horizontal gradient measure with a horizontal gradient threshold and defining said pixel as a potential vertical boundary in response to the horizontal gradient measure exceeding the horizontal gradient threshold; and
 determining said blocking artefact measure in dependence upon the vertical gradient measure of pixels defined as the potential horizontal boundary and upon the horizontal gradient measure of pixels defined as the potential vertical boundary.

18. An apparatus for determining a measure of blocking artefacts in a video signal representing a plurality of pixels having a value, the apparatus comprising:
 a processor for generating a quality measure;
 a store for storing said quality measure;
 the processor capable of executing instructions to perform steps offor each of a plurality of pixels
 determining a vertical gradient measure in dependence upon the values of said pixel and horizontally and vertically neighbouring pixels, in which the vertical gradient measure is equal to the greater of (a) the difference between an average of the values of said pixel and three pixels to a first side of said pixel and an average of the values of four pixels positioned vertically to said pixel, and (b) the difference between an average of the values of said pixel and three pixels to a second side of said pixel and an average of the values of four pixels positioned vertically to said pixel;
 comparing said vertical gradient measure with a vertical gradient threshold and defining said pixel as a potential horizontal boundary in response to the vertical gradient measure exceeding the vertical gradient threshold;
 determining a horizontal gradient measure in dependence upon the values of said pixel and horizontally and vertically pixels;
 comparing said horizontal gradient measure with a horizontal gradient threshold and defining said pixel as a potential vertical boundary in response to the horizontal gradient measure exceeding the horizontal gradient threshold; and
 determining said blocking artefact measure in dependence upon the vertical gradient measure of pixels defined as the potential horizontal boundary and upon the horizontal gradient measure of pixels defined as the potential vertical boundary.

19. An apparatus according to claim 17, further comprising means for analysis and visualization of said quality measure.

* * * * *